United States Patent
Parvarandeh et al.

(10) Patent No.: US 9,485,094 B1
(45) Date of Patent: Nov. 1, 2016

(54) SYSTEMS AND METHODS FOR STABLE PHYSICALLY UNCLONABLE FUNCTIONS

(71) Applicant: Maxim Integrated Products, Inc., San Jose, CA (US)

(72) Inventors: Pirooz Parvarandeh, Los Altos Hills, CA (US); Sung Ung Kwak, Frisco, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 137 days.

(21) Appl. No.: 14/480,129

(22) Filed: Sep. 8, 2014

Related U.S. Application Data (60) Provisional application No. 61/981,948, filed on Apr. 21, 2014.

(51) Int. Cl.
*H04L 9/08* (2006.01)

(52) U.S. Cl.
CPC .................................. *H04L 9/0861* (2013.01)

(58) Field of Classification Search
CPC .................................................. H04L 9/0861
See application file for complete search history.

(56) References Cited

U.S. PATENT DOCUMENTS 7,757,083 B2 * 7/2010 Devadas ............... G06F 21/31
380/229

2012/0183135 A1 * 7/2012 Paral .................... G09C 1/00
380/44
2013/0156183 A1 * 6/2013 Komano ............. H04L 9/0866
380/44
2014/0185795 A1 * 7/2014 Gotze .................. G06F 21/44
380/44

FOREIGN PATENT DOCUMENTS

| DE | WO 2012122994 A1 * | 9/2012 | ............ G06F 21/71 |
| NL | WO 2007031908 A2 * | 3/2007 | ............ G06F 21/86 |
| WO | WO 2011088074 A2 * | 7/2011 | ........... H04L 9/0861 |

OTHER PUBLICATIONS

Pappu Srinivasa Ravikanth. "Physical One-Way Functions" © 2001 Massachusetts Institute of Technology (pp. 1-153).*
Blaise Gassend et al. "Silicon Physical Random Functions" Proceedings of the 9th ACM conference on Computer and communications security (Nov. 2002) pp. 148-160.*

* cited by examiner

*Primary Examiner* — Joseph P Hirl
*Assistant Examiner* — Thomas Gyorfi
(74) *Attorney, Agent, or Firm* — North Weber & Baugh LLP (57) ABSTRACT

Various embodiments of the invention allow to take advantage of the natural statistical variation of physical properties in a semiconductor device in order to create truly random, repeatable, and hard to detect cryptographic bits. In certain embodiments, this is accomplished by pairing mismatch values of PUF elements so as to ensure that PUF key bits generated therefrom remain insensitive to environmental errors, without affecting the utilization rate of available PUF elements.

20 Claims, 10 Drawing Sheets

| Error Rate | Discard Window (ΔW) | ΔW when normalized to $\sigma(\Delta Vgs)$ | Utilization (% of samples outside ΔW) |
|---|---|---|---|
| $1.59*10^{-1}$ | $1\sigma$(Temperature Drift) | $0.13\sigma(Vgs)$ | 89.7 |
| $1.35*10^{-3}$ | $3\sigma$(Temperature Drift) | $0.39\sigma(Vgs)$ | 69.7 |
| $3.17*10^{-5}$ | $4\sigma$(Temperature Drift) | $0.52\sigma(Vgs)$ | 60.3 |
| $9.87*10^{-10}$ | $6\sigma$(Temperature Drift) | $0.78\sigma(Vgs)$ | 43.5 |

SYSTEMS AND METHODS FOR STABLE PHYSICALLY UNCLONABLE FUNCTIONS

CROSS REFERENCE TO RELATED PATENT APPLICATIONS

This application claims priority to U.S. Provisional Application No. 61/981,948, titled "Systems And Methods For Stable Physically Unclonable Functions," filed Apr. 21, 2014, by Pirooz Parvarandeh and Sung Ung Kwak, which application is hereby incorporated herein by reference in its entirety and from which application priority is hereby claimed.

BACKGROUND

A. Technical Field

The present invention relates to secure microcontroller systems for identification and authentication and, more particularly, to systems, devices, and methods for random encryption key generation with Physically Unclonable Functions (PUFs).

B. Background of the Invention

Semiconductor processing is aimed at minimizing process variations that are responsible for tolerances generated in physical components on a wafer that result in variations in threshold values of transistors, capacitances, resistance values, etc. By virtue of the manufacturing techniques employed, including non-uniform deposition and etching processes, whose repeatability remains imperfect, variations between components cannot be completely eliminated. The statistical nature of these variations is accompanied by an inability to obtain information about the components merely by inspecting the component layout. In other words, absent extremely difficult measurements at the component level, these physical variations cannot be detected or copied.

PUF design takes advantage of these small but characteristic manufacturing variations in physical semiconductor components in order to generate sequences of random, unique cryptographic keys. In some existing designs, individual key bits are determined based on a mismatch in polarity of PUF elements to generate single bit results. In a typical Gaussian distribution of mismatch, a relatively large number of the population of PUF elements will be centered around the midpoint of the distribution. Given the influence of other non-manufacturing variations, such as voltage shifts, temperature drift, relative aging processes, package stress, noise, etc., the use of commonly employed Zero-One comparators leaves open the possibility that a key bit undesirably changes from a zero value to a one and vice versa based on the polarity of a single PUF element, thereby, negatively affecting the repeatability of a stored code.

Ideally, PUF elements are made of circuit components that exhibit a large mismatch so as to minimize the effect of environmental changes on the device to improve repeatability and stability of the generated key bits. Since the part of the population of PUF elements that exhibits relatively little mismatch is statistically more likely to experience a change in sign, PUF elements that fall within that population are not suitable for the purpose of generating random key bits. Therefore, PUF elements that exhibit relatively little mismatch are typically excluded from any given batch in order to prevent PUF output bit responses that would be sensitive to environmental changes and result in unstable crypto keys.

Unfortunately, techniques to exclude a significant part of the population of PUF elements in order to increase stability lowers the overall utilization rate. What is needed are tools for secure computing system designers to enable a high utilization rate of PUF elements without negatively impacting stability and accuracy of key bits generated by electronic PUF systems.

SUMMARY OF THE INVENTION

The disclosed systems and methods allow designers to reduce PUF element sensitivity due to errors caused by environmental variations (e.g., temperature drift), process variations, noise, etc. This ensures that, over time, such errors do not cause PUF key bits to become unstable or result in decreased utilization rates.

Certain embodiments of the present invention improve stability by individually measuring mismatch values of PUF elements and pairing them in a manner such that the difference in mismatch value between the two given elements is sufficiently large so as to ensure that PUF key bits generated from PUF elements remain insensitive to the various errors. The increased stability prevents undesired flipping of bits and ensures that PUF key bits are reliably generated.

In various embodiments, a statistical distribution of mismatches between physical devices (e.g., a Normal distribution) is obtained and transformed into another statistical distribution (e.g., a bi-modal distribution) by subtracting paired mismatch values via a dedicated selection circuit that controls the selection of PUF elements. The attributes of the paired mismatch values resulting from the transformation process allow for the generation of stable PUF key bits. In some embodiments, the pairs of mismatch values are stored in a manner that makes it difficult to detect the sequence of the generated key bits.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

FIGURE ("FIG.") 1 is a bar graph of an exemplary measured distribution of Vgs mismatch in MOS devices that have been manufactured in a 0.18 um semiconductor process according to various embodiments of the invention.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

In this document the terms "variation" and "mismatch" are used interchangeably. "PUF elements" and "PUF devices" include physical, chemical, and other elements recognized by one of skilled in the art.

Figure 1:
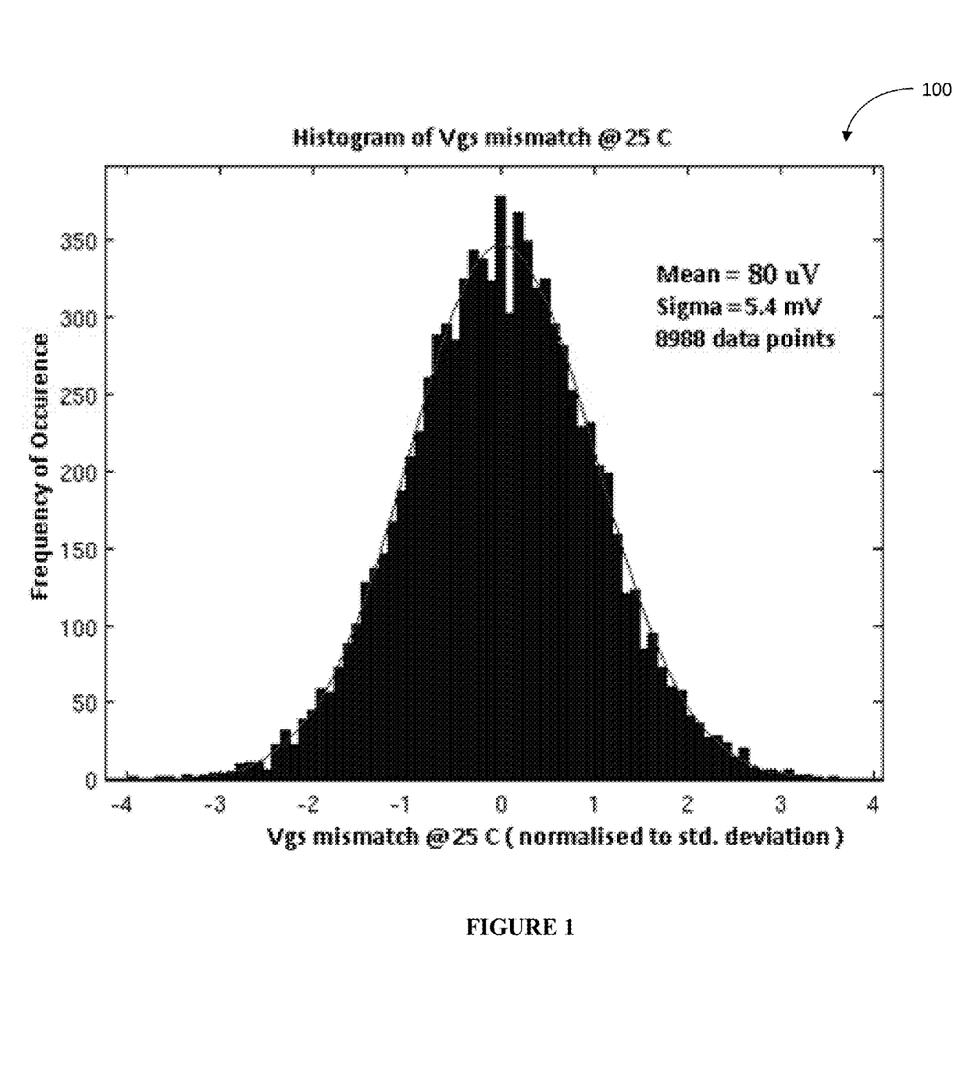

FIG. 1 is a histogram of an exemplary measured distribution of Vgs mismatch approximating a distribution of threshold voltage mismatches in MOS devices that have been manufactured in a 0.18 um semiconductor process, according to various embodiments of the invention. Mismatch in PUF elements may be caused by a number of factors, including variations in doping concentrations, gate oxide thickness, and tolerances in geometry that result from imperfect semiconductor manufacturing processes during the manufacturing of the MOS devices.

Mismatch distribution 100 is measured at an ambient temperature of 25° C., for example, at wafer sort. The horizontal axis represents mismatches in threshold voltage for 8988 measured data points. The vertical axis represents the frequency of occurrence of a given threshold voltage mismatch. As shown in FIG. 1, the distribution 100 is normalized and calculated to have a standard deviation of 5.4 mV. That is, about 68% of the mismatch population falls within a +/−5.4 mV data variation.

Figure 2:
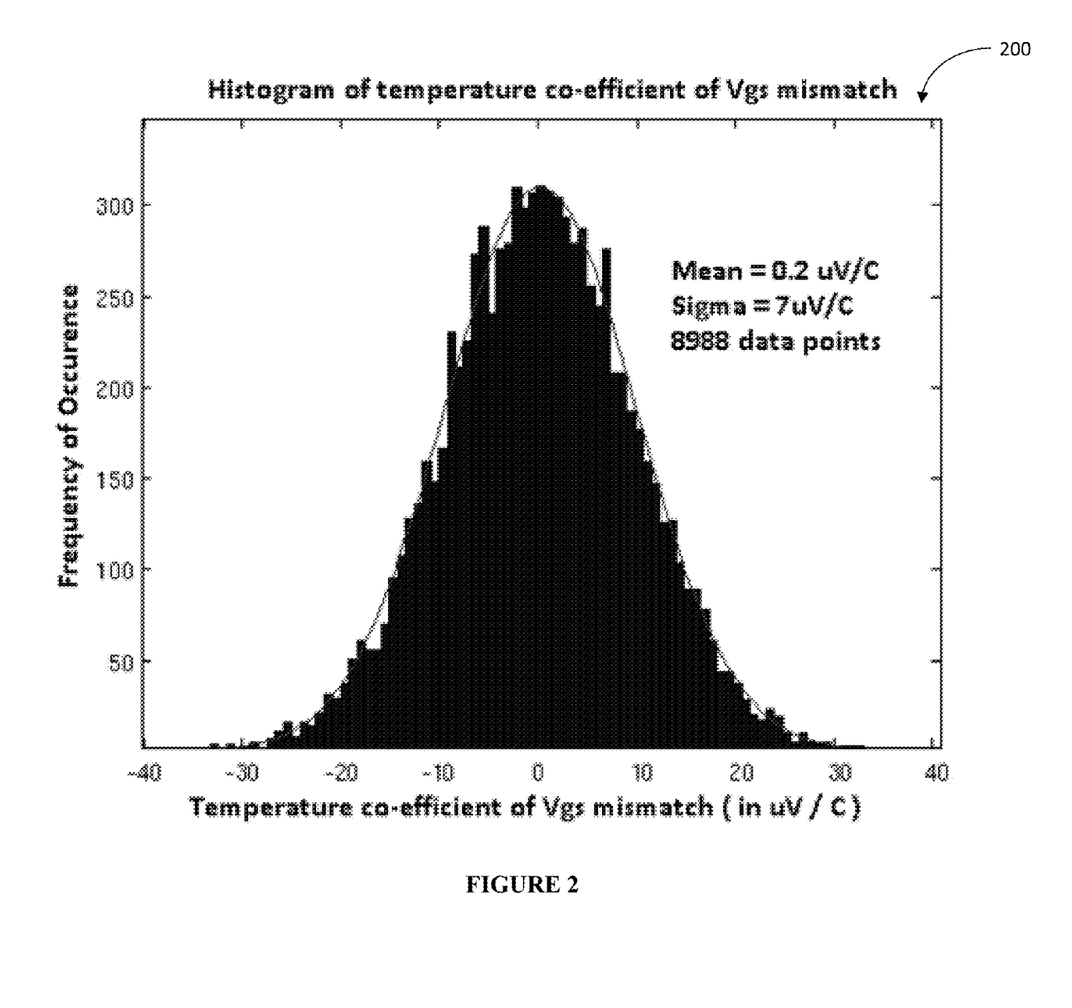
FIG. 2 is a bar graph illustrating a distribution of temperature coefficients for the measured mismatch values corresponding to FIG. 1.

FIG. 2 illustrates a distribution of temperature coefficients for the measured mismatch values corresponding to FIG. 1. As used in this example, temperature coefficient is defined as an offset voltage over a temperature range divided by that temperature range. Assuming that the operating temperature of the measured 8988 physical devices in FIG. 2 ranges from −40° C. to 25° C. and from 25° C. to 125° C., a drift of about 700 μN in offset voltage is expected over the 100° C. temperature range. The standard deviation, sigma, of the temperature coefficient is then about 0.7 mV/° C. When normalized to Vgs, this corresponds to a confidence level of 0.13 σ, as shown in table 300 in FIG. 3.

Figure 3:
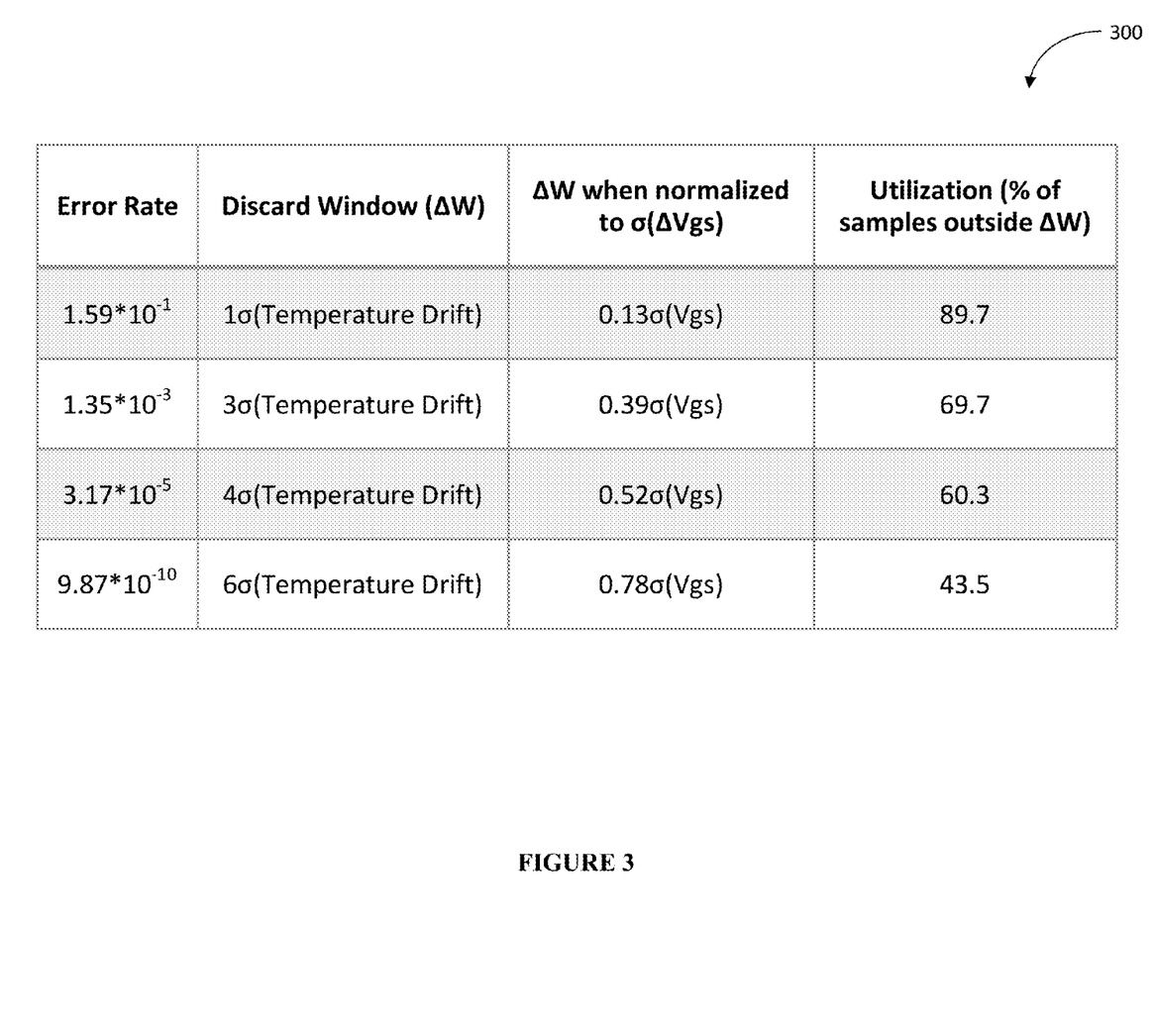
FIG. 3 shows exemplary expected utilization rates of PUF elements as a function of error rate according to various embodiments of the invention.

Table 300 in FIG. 3 shows exemplary expected utilization rates of PUF elements as a function of error rate according to various embodiments of the invention. Ideally, the error rate, i.e., the probability of mis-reading a single bit that is caused by a change in polarity, for example due to environmental effects, is zero.

As can be easily calculated from Table 300, about 10.3% of the total PUF elements within a given population need to be excluded from the Gaussian distribution in order to achieve an error rate of about 0.16 (i.e., the probability that the mismatch falls outside of the 1 a limit is 16%), resulting in an overall utilization rate of 89.7%. In order to reduce the error rate, for example, to allow for operation within a wider temperature range, an increasing number of PUF elements must be discarded from the distribution to ensure stable PUF bits. However, the improvement in error rate comes at the expense of a reduction in the number of usable PUF elements that can are capable of generating PUF bits.

Intuitively, the more PUF elements located close to the center of the distribution are used, the smaller will be their mismatch and the more unrepeatable PUF bits will be included in the selection, resulting in a larger error rate. Therefore, it would be desirable to have systems and methods to avoid this trade-off between utilization and error rate. It is noted that the methods and systems presented herein are independent of the type of specific statistical distribution of any sampled group of actual components.

Figure 4:
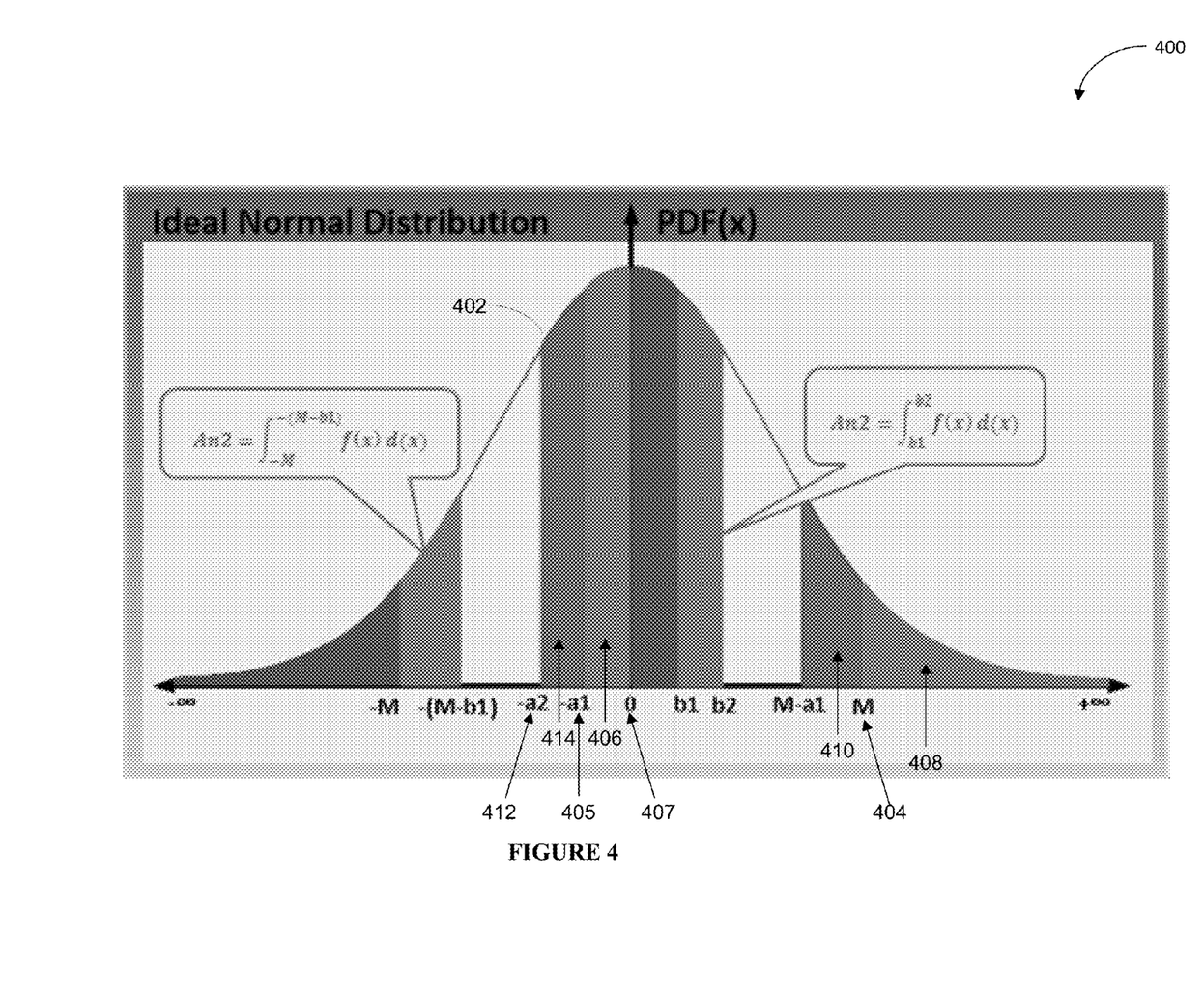
FIG. 4 generally illustrates a pairing process of mismatch values using a Gaussian distribution to generate PUF key bits according to various embodiments of the invention.

FIG. 4 generally illustrates a paring process of mismatch values using a Gaussian distribution to generate PUF key bits according to various embodiments of the invention. Assuming mismatch values (e.g., threshold voltages) of measured PUF elements are distributed according to Gaussian distribution 400, similar to FIG. 1, in one embodiment, mismatch values are combined by pairing them in the following manner. First, a value M 404 is determined based on an expected variation in threshold voltage due to temperature, time, voltage drift, etc., and an acceptable error rate that corresponds to a certain discard window. Second, value −a1 405, located on the negative side of distribution 400 is determined in a manner such that the area under curve 400 in first region 406 from −a1 405 to zero 407 is equal to the area under curve 400 in positive second region 408 that extends from M 404 to +∞, i.e., that covers the far right positive numbers of distribution 400. First and second region 406, 408 represent a number of mismatch pairs that can be assigned to a first bin (shown in column 1 in table 500 in FIG. 5). Combining pairs from regions 406, 408 provides for a unique 1-to-1 mapping between PUF elements whose difference is a relatively large number that, by definition, is greater than or equal to the value of M 404. By ensuring that the difference between mapped pairs is larger than a minimum value, a safety margin is built-in to account for changes to the associated PUF elements that might occur due to environmental variations negatively affecting the repeatability of the generation of PUF key bits.

Next, the width of first region 406 is used to determine the width of third region 410 adjacent to second region 408. The width of third region 410 is used to find value −a2 412, which defines fourth region 414 that is paired with third region 410. Next, mismatch values that are located in regions adjacent to third and fourth region 410, 414, respectively, are paired, etc. This process of pairing and grouping PUF elements is repeated until entire distribution 400 is covered with pairs of PUF elements that can be characterized as having a minimum distance between them, thereby, achieving maximum utilization of PUF elements. In one embodiment, the pairing of mismatch values is accomplished by performing a subtraction on pairs of mismatch values selected from distribution 402, wherein each mismatch value represents an amplified offset voltage to obtain a difference value associated with the pair.

In any given population, it is desirable to find and utilize as many PUF elements as possible. In example in FIG. 4, pairing of mismatch values results in progressively smaller bin sizes of PUF elements (i.e., the area of region four 414 is smaller than first region 406). However, this is not intended as a limitation on the invention. In fact, while a typical semiconductor process generates statistical variations having a Gaussian distribution, the various embodiments of the invention are not limited to any specific statistical distribution. For example, depending on the various gradients that the semiconductor process may generate on a wafer, aging processes, and the like, any other statistical distribution may be employed to pair mismatch values.

Figure 5:
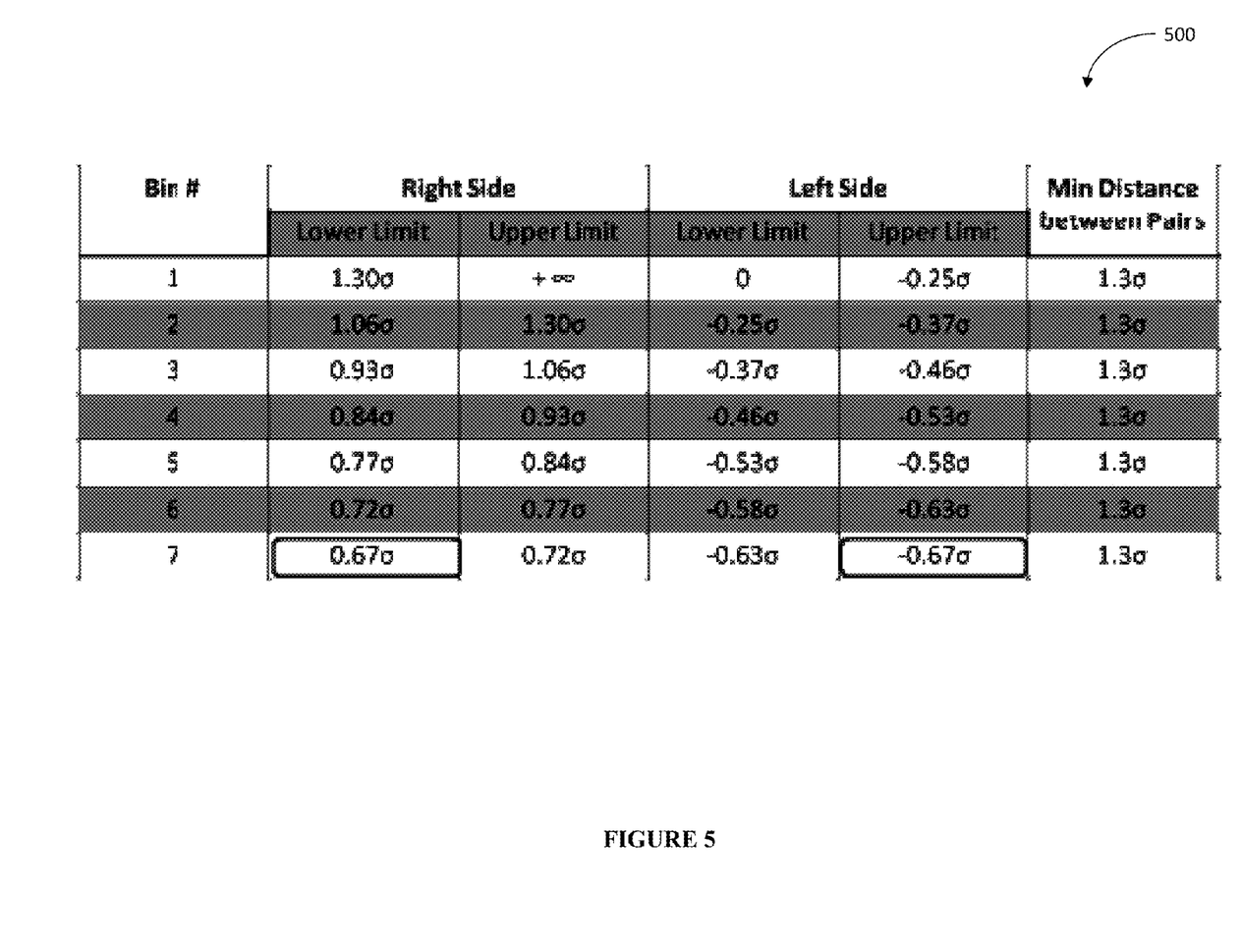
FIG. 5 illustrates exemplary bins that ensure a minimum distance between paired mismatch values of PUF elements according to various embodiments of the invention.

Table 500 in FIG. 5 illustrates exemplary bins that ensure a minimum distance between paired mismatch values of PUF elements according to various embodiments of the invention. Table 500 demonstrates that for an exemplary Gaussian distribution of 256 PUF elements, a minimum distance between any two PUF elements of at least 1.3 times the standard deviation allows for a 100% utilization of PUF elements in the distribution. The selection of an M value, which determines the minimum separation of a pair of PUF elements, depends on expected variations due to drift mechanism caused by, e.g., temperature, time, and voltage shifts etc. M should be selected in a manner so as to provide for an acceptable bit error rate. Once M is determined within the confines of the acceptable bit error rate, the mismatch distribution dictates the details of the binning process, i.e., which PUF elements fall into which region in the distribution in FIG. 4. The resolution of the binning in FIG. 5 is selectable, e.g., 500 μN, but should not be too small so as to limit the number of elements in the bins so much that some bins would contain no elements at all.

In practice, M should be chosen sufficiently large to accommodate the desired safety margin in separation for the 128 pairs, but not so large as to result in an insufficient number of samples in the bins, whose sizes get progressively smaller, as discussed above, because it could result in a scenario in which less than the entire distribution is covered. It has been found that an M value of as large as 1.3 times sigma can ensure 100% utilization of the distribution, as shown in table in FIG. 5 from which the Gaussian distribution of FIG. 4 may be reconstructed. It is noted that a 100% utilization of PUF elements is not required for purposes of the invention.

Advantageously, systematic errors do not affect the outcome, as these errors are inherent to the entire system and apply equally to all mismatch pairs. Errors caused by noise are also negligible when compared with the magnitude of the differences being detected.

Figure 6:
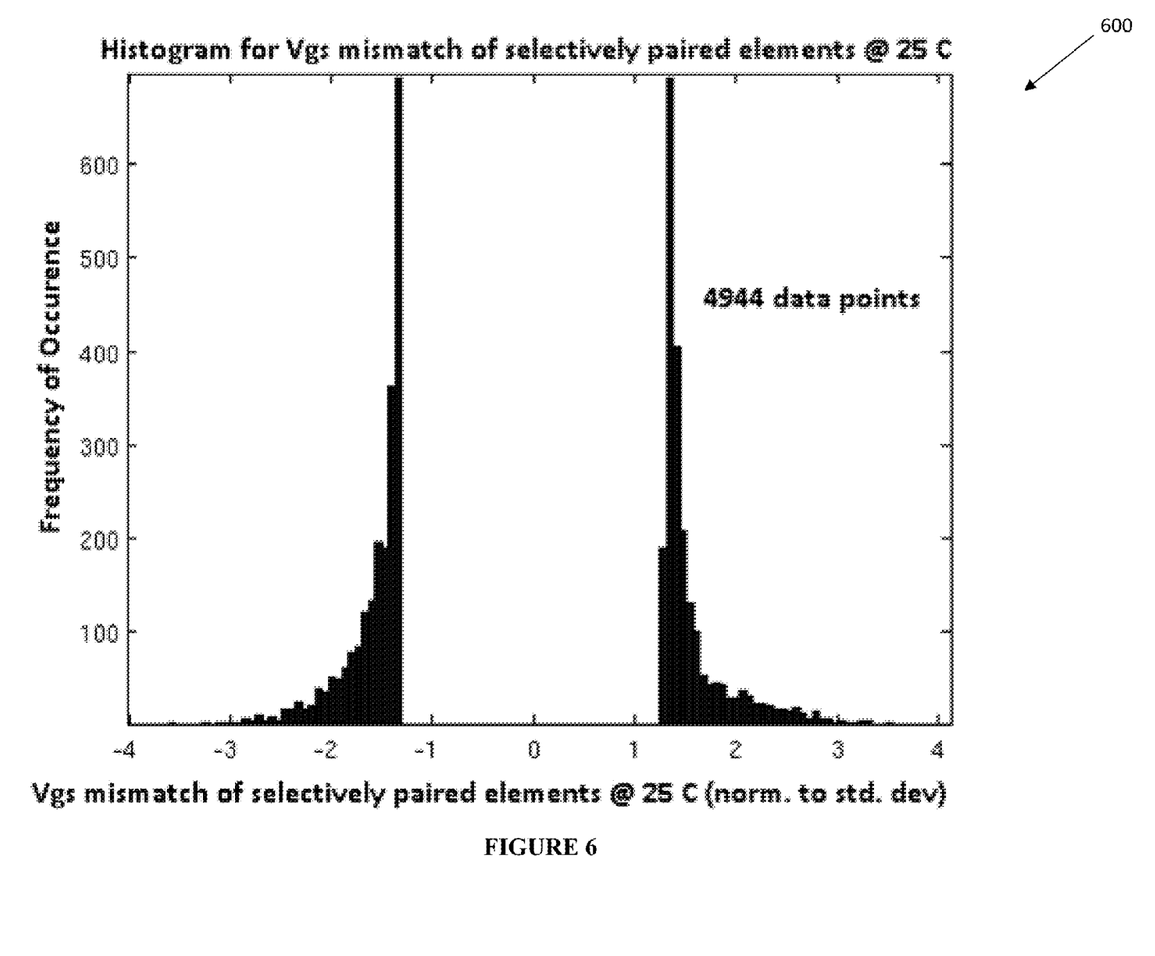
FIG. 6 illustrates an exemplary bi-modal distribution of paired mismatch data resulting from a transformation of the Gaussian distribution shown in FIG. 4.

FIG. 6 illustrates an exemplary bi-modal distribution of paired mismatch data resulting from a transformation of the Gaussian distribution shown in FIG. 4. Each sample in bi-modal distribution 600 is derived from a set of paired mismatch data points that are associated with each other using the above method. Distribution 600 displays an exclusion range around its center that satisfies the criterion for a minimum separation of pairs of PUF elements intended to ensure the generation of stable PUF bits.

The effect of pairing PUF elements in this manner is to convert the Normal distribution of the Vgs mismatch of FIG. 1 into bi-modal distribution 600 that comprises no Vgs values between +/−7 mV (+/−1.3*5.4 mV). Considering 700 μV of total temperature drift over a temperature range from −40° C. to +125° C., this +/−7 mV separation corresponds to about 10 times the standard deviation of Vgs mismatch and a greatly improved expected error rate of $7.62*10^{-24}$.

Figure 7:
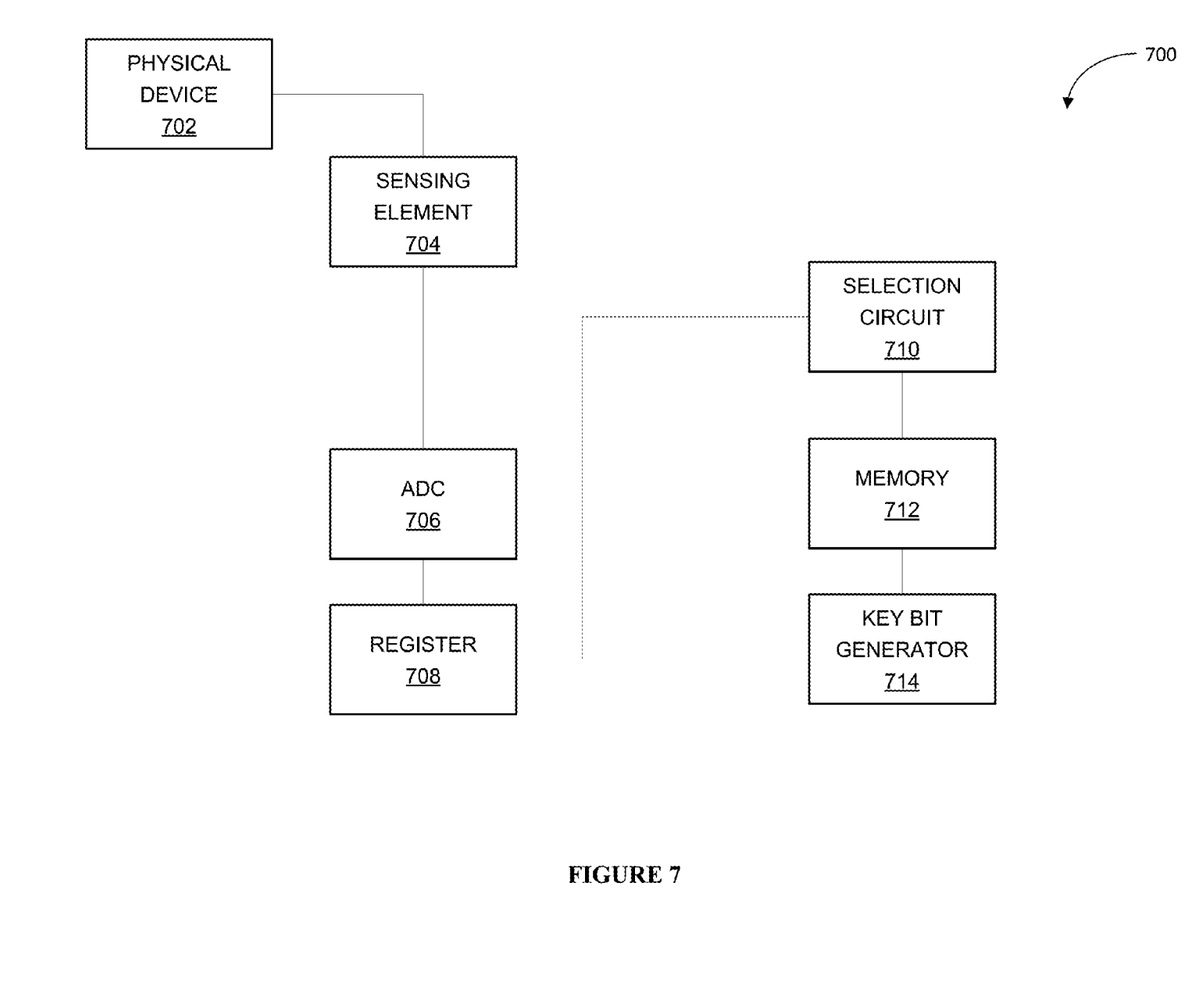
FIG. 7 illustrates a system to generate stable PUF key bits according to various embodiments of the invention.

FIG. 7 illustrates a system to generate stable PUF key bits according to various embodiments of the invention. System 700 includes physical device 702, sensing element 704, analog-to-digital converter (ADC) 706, register 708, selection circuit 710, memory 712, and key bit generator 714. Sensing element 704 is a device that detects or measures variations in a characteristic of physical device 702. The characteristic may be associated with a mismatch in current, charge, voltage, etc., in two or more PUF elements.

In operation, sensing element 704 converts the measured physical property into analog data (e.g., an amplified mismatch value) representing the measured quantity. The analog data may be provided to ADC 706 that converts the measured information into digital data for subsequent storage into register 708, which may be either off-chip or on-chip temporary memory. The digital data represent the measured mismatch in the characteristic of the PUF elements and have a similar statistical distribution.

Selection circuit 710 accesses register 708 to process the data therein by selecting and quantifying differences in mismatch values between pairs of devices. This may be accomplished by assigning a numerical value to the difference between each pair. In one embodiment, the numerical values comprise pairing information that are stored in on-chip non-volatile memory 712. Selection circuit 710 may be implemented, for example, as an internal or external microcontroller, state-machine logic, or in software.

Key bit generator 714 receives the stored information and generates a random number therefrom. Ideally, the random number has no patterns associated with it and is unaffected by environmental parameters, such as temperature, that affect the semiconductor device. In addition, the random number should be very difficult to detect, i.e., it should not be stored in a flash memory type device that can be processed to retrieve previously stored data.

In one embodiment, during an initial test operation, the mismatch distribution is determined and PUF elements are assigned to bins to generate pairing information based on the mismatch distribution. In this mode, register 708 receives measured mismatch data from ADC 706 and stores it, for example, in one or more registers. I.e., register 708 comprises sensitive information from which keys may be reconstructed. For security reasons, in one embodiment, the information stored in register 708 is erased once pairing information has been stored in memory 712 as the output of ADC 706 does not to be re-read. By having access to mismatch pairing information alone, no sensitive information is revealed about the mismatch distribution that was output by ADC 706 and kept in temporary register 708. No key is generated at this time. In other words, without the raw mismatch data a potential adversary would not be able to uncover or replicate the data to be paired that is necessary to generate the key.

In one embodiment, in a normal operation mode, the mismatch distribution is not being analyzed. ADC 706 re-measures the mismatch information via sensing element 704, for example at power-up, and key bit generator 714 generates the key using the ADC outputs based on the pairing information, for example, by retrieving mismatch pairs based on information stored in memory 712 and subtracting the two mismatch values of each pair in order to generate a key.

One advantage of system 700 is that it is not vulnerable to attack by potential hackers, because even if an attacker obtains pairing information from memory 712, the pairing information alone would not reveal the keys and, thus, render the attack fruitless. Another advantage is that variations due to environmental effects are accounted for by virtue of selection of an appropriate value for M, thus, ensuring the repeatable and reliable generation of a unique key. One skilled in the art will appreciate that ADC 706 may be replaced with any other conversion circuit, including an operational amplifier, comparator, or digitization circuit.

Mismatch information of PUF elements existing in physical device 702 may be obtained in various forms, such as the form of electrical, magnetical, or optical information. System 700 may comprise additional components that convert, amplify, process, and secure data, including logic devices and power sources known in the art.

In one embodiment, in order to restore the key, mismatch information of PUF elements is re-measured and processed with pairing information retrieved from memory 712, for example by subtracting two mismatch values, in order to generate a PUF key. The inventors envision that mismatch values are processed by any mathematical operation, for example, multiplication. In addition, any number of mismatch values may be selected and combined for processing. For example, three mismatch values may be multiplied to generate a PUF key. In addition, different algorithms may be used on different physical devices in order to decrease detectability and, thus, enhance security.

Figure 8:
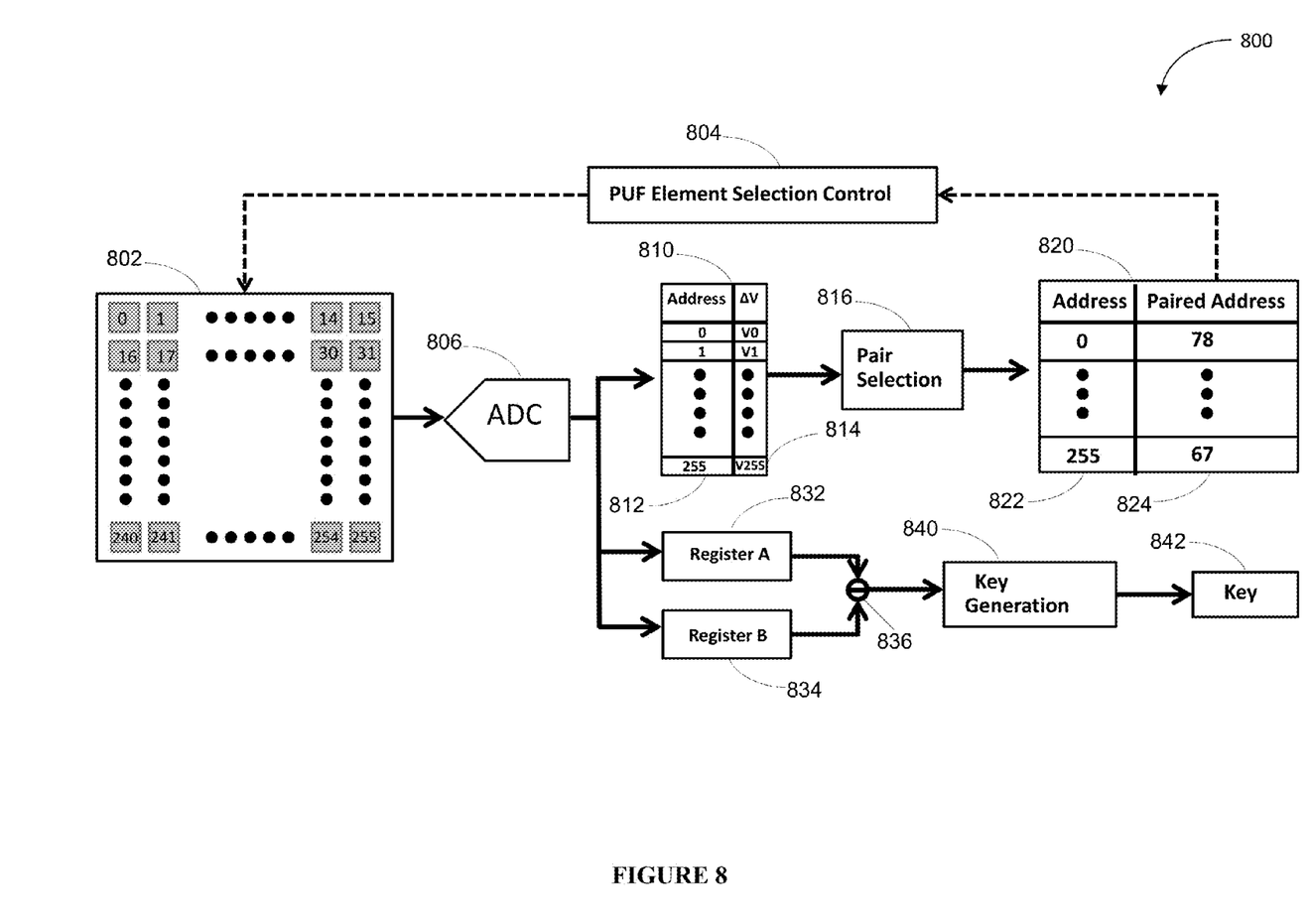
FIG. 8 is an exemplary implementation of a system to generate a stable 128 bit PUF key according to various embodiments of the invention.

FIG. 8 is an exemplary implementation of a system to generate a stable 128 bit PUF key according to various embodiments of the invention. System 800 includes PUF element array 802, control element 804, ADC 806, registers 810, 832 and 834, summation element 836, selection circuit 816, non-volatile memory 820, and key generation element 840, which generates key 842. PUF element array 802 comprises 16×16 bits representing 256 measured samples. ADC 806 digitizes the mismatch of each PUF element. Register 810 is a 256 address register that should be stored off chip as should selection circuit 816. In this example, non-volatile memory 820 is a 256 address memory. It is noted that not all addresses 822 of memory 820 are populated with numbers. In this example, the generation of a 128 bit PUF key 842 requires 256 PUF elements 802, because selection circuit 816 combines two paired elements to generate one PUF bit. In other words, only half of addresses 822 in memory 820 will be occupied and selected in order to avoid losing complete information about the pairing. Alternatively, memory 820 may comprise only 128 addresses and two banks of registers associated with each address. The two banks may contain addresses elements paired by selection circuit 816.

In operation, in an initial testing phase, mismatches of all 256 PUF elements of PUF element array 802 are determined, for example by a sensing device (not shown), and forwarded to ADC 806. The output of ADC 806 is then temporarily stored in register 810, such that register 810 contains all 256 mismatches in digital form in address 812. Address 812 of register 810 corresponds to PUF elements 0 to 255 in PUF element array 802. Register 810 stores the equivalent of the exemplary Gaussian distribution shown in FIG. 4. Mismatches are represented by a number, here, a voltage difference. The content of address 0 in register 810 represents the mismatch associated with element number 0; mismatch data of PUF element 1 is stored at address 1, and so forth.

From the 256 sampled mismatch data points a mathematical distribution can be established and a standard deviation can be calculated for its variation. In one embodiment, the standard deviation is used to determine the size of bins into which the mismatch values are then assigned. This may be accomplished by using the method to pair mismatch values according to FIG. 4 in order to obtain bin sizes as shown in FIG. 5. In this example, the number of parts per bin is not kept equal, but rather decreases with distance from the center due to the requirement of a minimum distance between pairs.

Comparing the data stored in register 810 to the bin locations specified in the table, the pairing information can be obtained and stored into memory 820. In example in FIG. 8, the content of address 0 of register 810 is paired with the content at address 78, such that the difference between the contents of two paired addresses is greater than a predefined value M. The resulting pair is stored at address 0 in memory 820. Similarly, address 1 of register 810 is paired with the content at address 154, etc., such that the difference between the content of two paired addresses is always greater than a certain value.

In one embodiment, in regular operation ADC 806 re-reads the 256 mismatch data points of PUF element array 802, for example at every power-up event. Once all the mismatch values are stored in register 810, the PUF key bits can be generated per the following equation:

$$K(i) = R(i) - R(NVM(0)), \text{ for } i=0 \text{ to } 255,$$

where $K(i)$ is the $i_{th}$ bit of the PUF key, $R(i)$ is the content of register 810 at the address 812 $i$ and $NVM(i)$ is the content of memory 820 at address 822 $i$.

After all the keys are generated, the contents of register 810 is erased. Again, knowing the contents of memory 820 does not reveal any information regarding the PUF keys associated with the part. It only shows the pairing information that is applicable to that particular part only. The pairing information is different from part to part. Since the measured data are unique to each part, this approach desensitizes the PUF key bits to the variations over different parts, wafers, lots or packages, etc.

In one embodiment, control circuit 804 causes ADC 806 to re-read the mismatch data points of PUF element array 802 and sequentially store them into register 832, 834 according to control circuit 804, instead of consecutively storing the data into memory 810. The contents of temporary register 832, 834, which is, e.g., a 8-bit register, are then subtracted by summation element 836 and forwarded to key generation module 840 to generate the PUF key bits of key 842. For example, the content of address 0 of register 820 is stored in register A 832, while the content of paired address 78 is stored into register B 834. Then address 1 of register 820 is stored in register A 832, and element 154 stored in register B 834, etc.

Storing the data in dedicated registers that are used, for example, for subtraction purposes only, has the added advantage that register 832, 834 is constantly rewritten, which prevents writing the same address in the same location. This automatic scrambling of data eliminates potential memory imprint issues and, thus, further increases system security.

It is understood that the various embodiments of the invention can be applied to any physical property with a natural variation, such as threshold voltage, oscillation frequency, resistance, capacitance, etc. In one embodiment, different characteristics of element pairs are combined to create the mathematical operation (e.g., Vt mismatch and capacitance mismatch). Further, one skilled in the art will appreciate that other memory structures can be used to store the pairing information generated by selection circuit 816.

Figure 9:
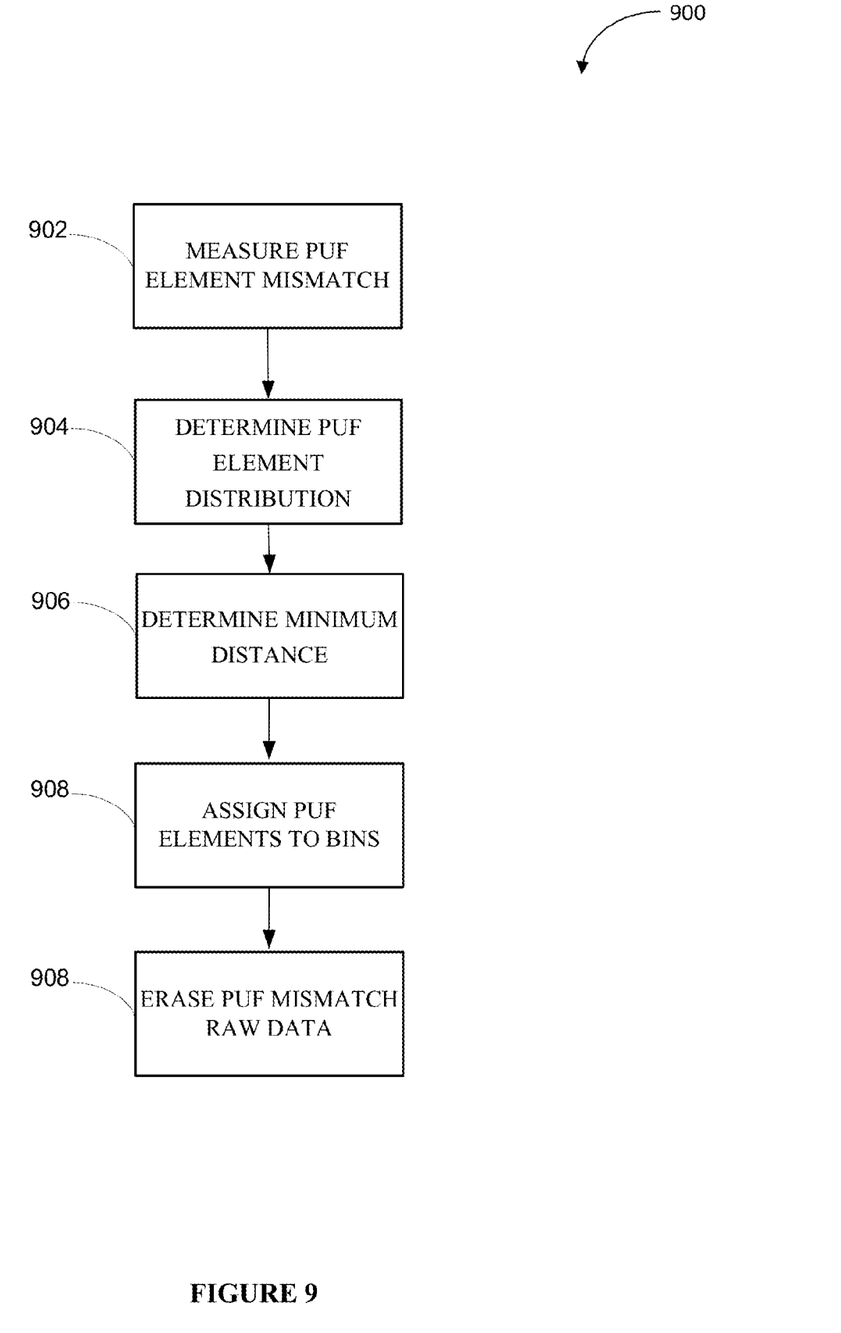
FIG. 9 is a flowchart of an illustrative process to generate pairing information according to various embodiments of the invention.

FIG. 9 is a flowchart illustrating a process to generate pairing information according to various embodiments of the invention. In one embodiment, in a testing phase preceding a normal phase that involves the actual generation of a key, pairing information is generated from raw mismatch data that has a statistical distribution associated with it.

The process to generate pairing information starts at step 902 when mismatch of PUF elements are measured, for example, by an ADC. The measured data may be stored in on-chip or off-chip temporary storage device.

At step 904 a PUF element mismatch distribution is determined from the measured data.

At step 906 a minimum distance is determined.

At step 908 PUF elements are assigned to bins, for example in a non-volatile memory, in order to establish pairing information.

At step 908 in order to increase system security, PUF raw mismatch data is erased to prevent access to mismatch information from which a key may be re-produced.

Figure 10:
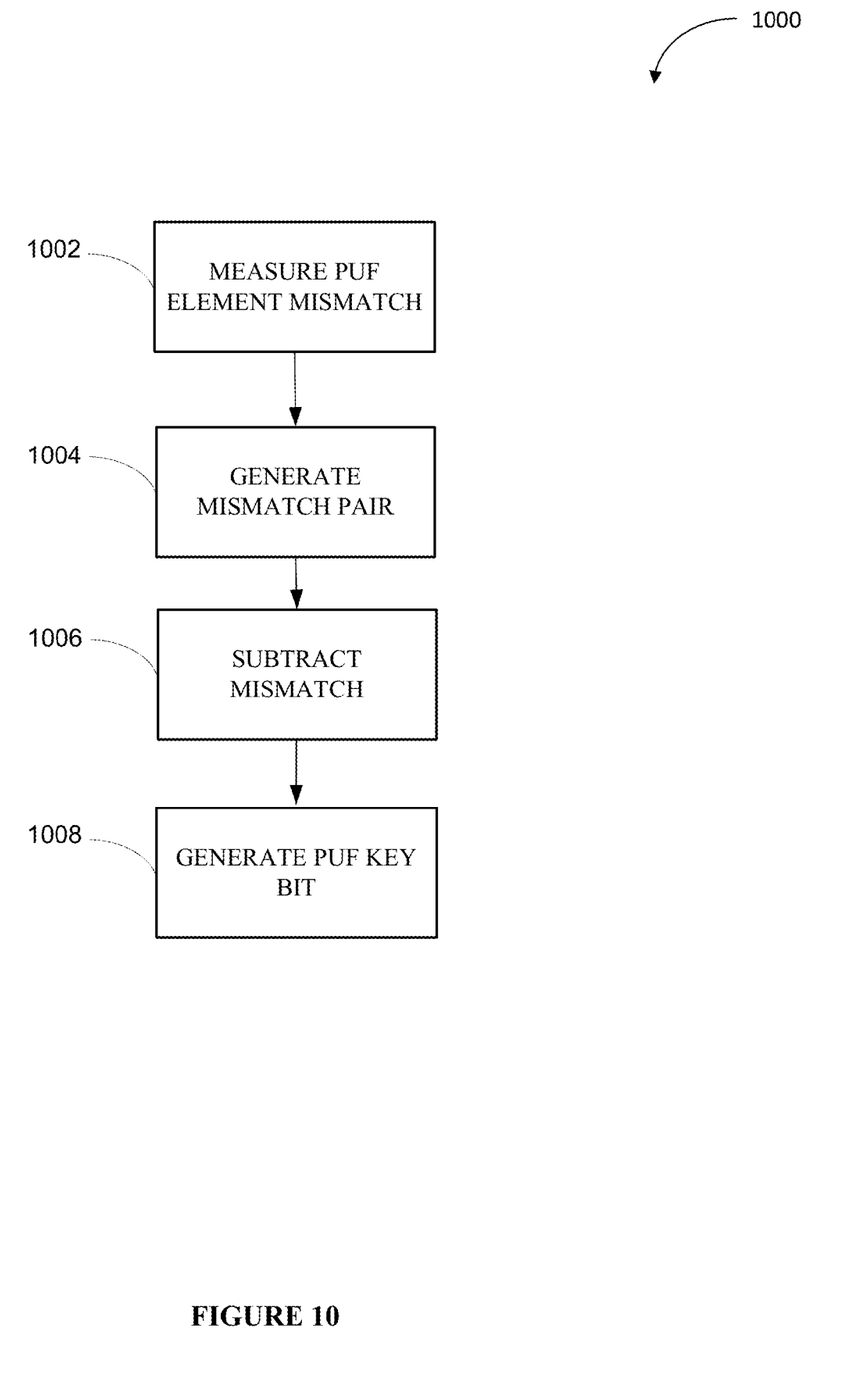
FIG. 10 is a flowchart illustrating a process to generate stable PUF key bits according to various embodiments of the invention.

FIG. 10 is a flowchart illustrating a process to generate stable PUF key bits according to various embodiments of the invention. In one embodiment, during a normal phase of operation, e.g., at start-up, some of the steps for analyzing the mismatch distribution presented in FIG. 9 are skipped.

At step 1002 in FIG. 10, mismatch of PUF elements is measured to generate measured mismatch data.

At step 1004 mismatch pairs are generated from the PUF elements, for example, by reading pairing information from a non-volatile memory and reconstructing mismatch pairs according to the pairing information.

Finally, at step 1006 one PUF element mismatch values of a mismatch pair are subtracted from each other to generate PUF key bits at step 1008. It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. An apparatus to generate stable PUF key bits, the apparatus comprising:
    a sensing element configured to detect mismatches in physical characteristics between PUF elements and output signals associated with the mismatches;
    a data converter coupled to the sense element, the data converter converts the output signals into mismatch data having a first distribution;
    a selection circuit coupled to receive the mismatch data from the data converter, the selection circuit generates a second distribution comprising paired data in a manner such that the difference within a pair is equal to or exceeds a predetermined value; and
    a sequence generator that generates a bit sequence associated with the paired data.

2. The apparatus according to claim 1, wherein selection circuit arranges the mismatch data into a plurality of groups to generate the paired data.

3. The apparatus according to claim 2, wherein the paired data has a bi-modal distribution.

4. The apparatus according to claim 2, wherein generating the bit sequence comprises subtracting mismatch data from at least two of the plurality of groups.

5. The apparatus according to claim 2, wherein the mismatch data is stored in a first memory and overwritten when a second memory stores the paired data.

6. The apparatus according to claim 5, wherein the selection circuit stores the plurality of groups in the second memory and selects the mismatch data from at least two of the plurality of groups to generate the pair.

7. The apparatus according to claim 5, wherein the first memory comprises a register that receives the pair.

8. The apparatus according to claim 7, wherein the data converter receives and sequentially stores the mismatch data into the register.

9. The apparatus according to claim 1, wherein the selection circuit comprises an external microcontroller that is configured to generate the paired data.

10. The apparatus according to claim 1, wherein the selection circuit is implemented in software.

11. The apparatus according to claim 10, further comprising a summation element coupled between the register and the sequence generator, the summation element subtracts contents of registers to output a result, the sequence generator generates the bit sequence in response to the result.

12. The apparatus according to claim 1, wherein the sensing element detects mismatches at a start-up condition.

13. A method of reliably reproducing randomly generated unique bit sequences, the method comprising:
    determining mismatch values related to at least one physical characteristic of a plurality of PUF elements, the mismatch values having a first distribution;
    generating an output signal that represents a degree of mismatch;
    converting the output signal into a second distribution; and
    generating a bit sequence associated with at least two mismatch values.

14. The method according to claim 13, further comprising:
    assigning the mismatch values to a plurality of groups within the second distribution; and
    paring data from the second distribution in a manner such that the difference within a pair is equal to or exceeds predetermined value.

15. The method according to claim 14, wherein assigning the mismatch values comprises
    assigning an equal number of mismatch values to a first bin and a second bin based on magnitudes of the mismatch values in a manner such that pairs of mismatch values from the first and second bin are mapped 1-to-1.

16. The method according to claim 15, wherein the number of mismatch values in the second bin are selected from opposing sides of the second distribution.

17. The method according to claim 13, wherein the first distribution is a normal distribution and the second distribution is a bi-modal distribution.

18. The method according to claim 13, further comprising determining a variation in the first distribution.

19. The method according to claim 13, wherein generating the bit sequence comprises subtracting mismatch values of pairs of mismatch values.

20. The method according to claim 13, wherein determining mismatch values occurs at a start-up condition.

* * * * *